United States Patent [19]

Grey

[11] 4,199,964
[45] Apr. 29, 1980

[54] THRUST TRANSMISSION OR THRUST PRODUCING DEVICE

[76] Inventor: John C. Grey, 30 Osterley Ct., Osterley, Middlesex, England

[21] Appl. No.: 805,782

[22] Filed: Jun. 13, 1977

Related U.S. Application Data

[63] Continuation-in-part of Ser. No. 774,214, Mar. 3, 1977, abandoned, which is a continuation-in-part of Ser. No. 549,338, Feb. 12, 1975, abandoned.

[51] Int. Cl.² .......................... F16D 3/56; F16D 7/00
[52] U.S. Cl. .......................................... 64/29; 192/45; 192/56 R
[58] Field of Search .................. 64/29, 28 A; 192/45, 192/56 R, 93 A; 188/368; 403/328

[56] References Cited

U.S. PATENT DOCUMENTS

| | | | |
|---|---|---|---|
| 865,486 | 9/1907 | Gannon | 64/29 |
| 2,351,040 | 6/1944 | Hawley | 188/368 |
| 3,307,664 | 3/1967 | Halsall | 192/56 R |
| 3,540,553 | 11/1970 | Bialkowski | 188/368 |
| 3,835,973 | 9/1974 | Braggins et al. | 192/56 R |

FOREIGN PATENT DOCUMENTS

| | | | |
|---|---|---|---|
| 594141 | 3/1934 | Fed. Rep. of Germany | 192/45 |
| 701041 | 1/1941 | Fed. Rep. of Germany | 64/29 |
| 2517910 | 11/1976 | Fed. Rep. of Germany | 64/29 |
| 1072862 | 9/1954 | France | 192/45 |
| 403411 | 6/1966 | Switzerland | 192/45 |
| 308905 | 4/1929 | United Kingdom. | |
| 483145 | 4/1938 | United Kingdom. | |
| 499598 | 1/1939 | United Kingdom. | |
| 601503 | 5/1948 | United Kingdom. | |
| 633611 | 12/1949 | United Kingdom. | |
| 672341 | 5/1952 | United Kingdom. | |
| 682531 | 11/1952 | United Kingdom. | |

Primary Examiner—Leslie Braun
Attorney, Agent, or Firm—Pearne Gordon Sessions

[57] ABSTRACT

A rotary torque transmission device has at least one pair of balls or rollers transmitting a torque load through respective contact points or lines with driving and driven members of the device and a contact point or line with each other. The contact points (or lines) do not lie on the same line (or plane) whereby the torque load produces an offset force. This is resisted by resilient means and increases with the torque load until the force overcomes said resistance and causes substantially friction-free rolling of the balls or rollers on said contact points or lines. In different embodiments the rolling movement disengages the drive through the device or it is utilized to stop the drive input.

11 Claims, 16 Drawing Figures

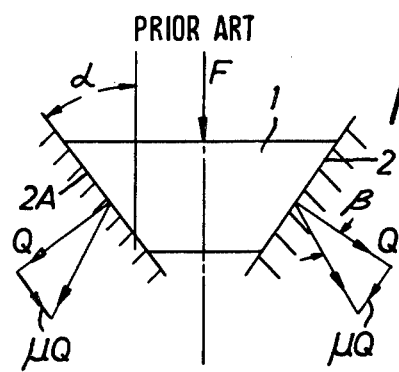
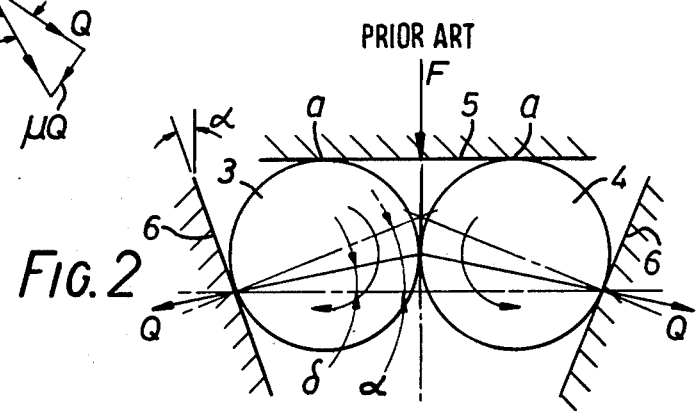
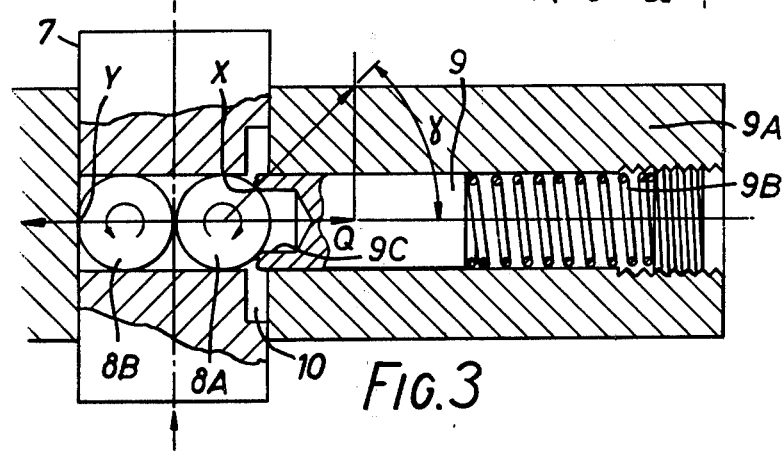
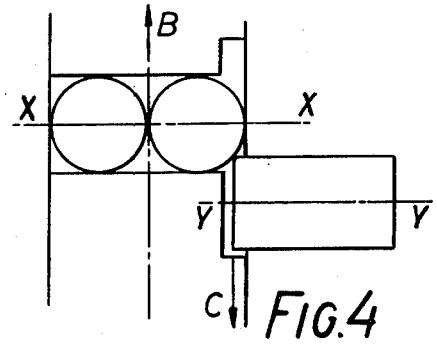

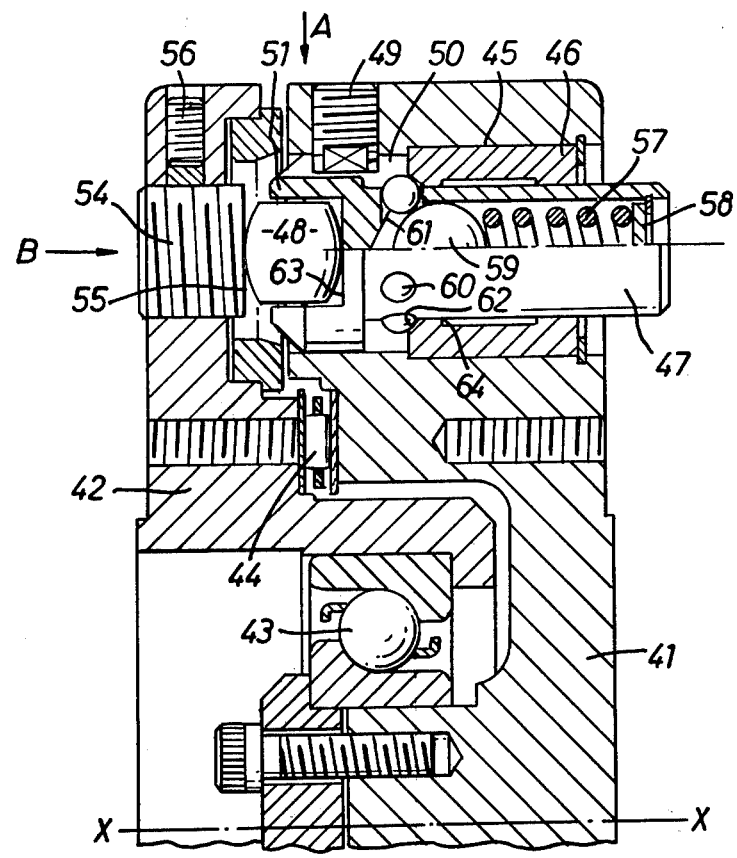
FIG.8
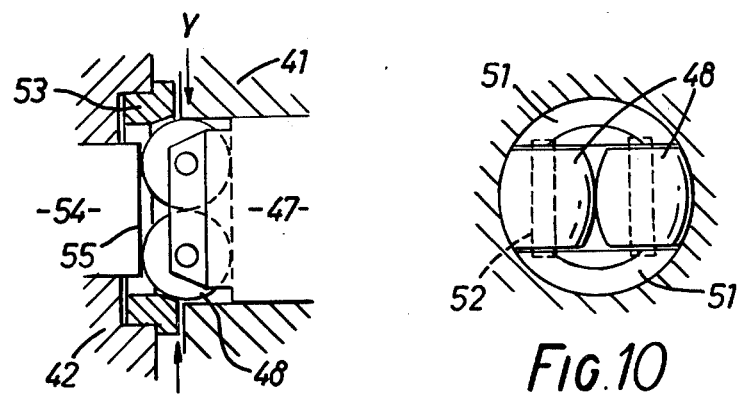
FIG.9
FIG.10

THRUST TRANSMISSION OR THRUST PRODUCING DEVICE

This is a continuation-in-part of application Ser. No. 774,214 filed Mar. 3, 1977, now abandoned, which was a continuation of application Ser. No. 549,338 filed Feb. 12, 1975, now abandoned.

BACKGROUND OF THE INVENTION

The present invention relates to torque transmitting devices, such as torque limiting clutches and torque sensors in which the torque load is transmitted through rolling elements, i.e. balls or rollers, arranged in a manner that is sensitive to unduly large torque loads.

The use of rolling elements in the form of balls or rollers in torque transmitting devices is well known, and, more particularly, such elements are known in overload release clutches. Examples are to be found in UK Pat. Nos. 846,450 and 881,560, both of which shown mechanisms in which two series of rollers mounted in radially inner and outer members respectively transmit the drive between said members. These clutches are released by allowing the rollers of the respective series to move past each other when a maximum loading is exceeded, but although such displacements are accompanied by some rolling movements, it is inherent in the arrangement of the rollers that they skid with respect to surfaces carrying some of the main reaction forces from the rollers and, accordingly, a significant amount of friction is experienced.

Another example of a clutch using balls as torque transmission elements is disclosed in UK Pat. No. 591,429. In this the mechanism comprises one series of balls transmitting the torque between driving and driven members, and a further inner series of balls bearing on the first series to hold them in their driving positions. The two series of balls are axially offset from each other so that the load on the torque-transmitting balls also produces a force component urging the balls of the second series axially away. Such axial movement is normally restrained but with an excessive rise in the torque load being transmitted, they are allowed to move away and the first series of balls are released from engagement between the driving and driven members. Here also there are major forces at points of sliding contact of the balls during the release action, as the second series of balls are held in a cage and are squeezed between the first series of balls and the cage to move, with their cage, axially of the coupling.

Such frictional effects are also experienced in the construction disclosed in UK Pat. No. 1,048,125 where a number of torque-transmitting rollers held axially against oblique faces of a driven member are required to slide on all their points of bearing contact to release the coupling. The release mechanism in this instance employs a thrust-applying device comprising a series of balls that are themselves constrained to slide on bearing points through which the main forces on them act, so that the frictional effects come from two different sources in the release of this form of coupling.

Another overload release coupling with single series of balls transmitting torque is to be found in UK Pat. No. 643,528. One of the balls of the series is used with an additional ball as a supplementary thrust-applying device having the purpose of operating a drive rotor cut-out mechanism when the coupling is overloaded and here also frictional effects are relatively high in relation to the force applied.

The frictional effects referred to above are of considerable significance in the operation of an overload release clutch. It is normally important that the release load shall be reliably and accurately preset in such a clutch, since failure to release when required might lead to damage through overloading the drive, while release at too low a load may cause unnecessary and wasteful stoppages. If frictional effects predominate, the presetting of the release load value becomes more uncertain and this is particularly so in the common circumstance where the release mechanism is required to operate only very occasionally. In that case, it becomes even more difficult to ensure the state of lubrication at points of sliding contact where the contacting surfaces do not move relative to each other while the mechanism is operating normally. The coefficient of friction may vary with time as any lubricant originally at the points of contact is gradually forced out due to the maintenance of high bearing pressures and the lack of relative movement at these points hinders the admission of further lubricant.

Although they are not concerned with torque transmission systems, reference may also be made to UK Pat. Nos. 483,145 and 488,598 which show drum brake mechanisms in which an operating thrust to expand the brake is applied by the displacement of a plunger which carries a pair of balls or rollers side-by-side between a pair of obliquely convergent abutment members attached to the brake shoes, so that the plunger acts in the manner of a wedge to force the members apart.

To explain the action of these devices, reference may be made firstly to FIG. 1 of the accompanying drawings which show a sliding wedge-type thrust applying device in which a wedge 1 applies a thrust F to two inclined planar surfaces 2 and 2A forcing them apart in a direction transverse to the force F. The resulting side thrust Q is accompanied by a frictional force $\mu Q$. The frictional force is considerable and if the angle $\alpha$ is too small or if $\mu$ is sufficiently large, the wedge becomes locked in position and/or the movement of the device is irreversible. In the drum brake mechanisms referred to, the wedge is replaced by a pair of identical balls or rollers 3,4, as shown in FIG. 2, and the plunger 5 acts through them to apply a side thrust to the surfaces 6. Movement of the plunger by the force F forces the two surfaces 6 apart as before but in this arrangement the two balls or rollers roll upon each other and on the inclined surfaces 6 and there is sliding or skidding only between them and the plunger. This greatly reduces the friction forces, since the force F will be considerably smaller than the side thrust Q, and in addition the angle $\delta$ formed by the positive contact of the balls or rollers with each other and with the side faces 6 is half the wedge angle $\alpha$ so that a greater mechanical advantage is obtained. However, the arrangement disclosed is capable only of producing reciprocating movements and has no obvious application to the transmission of a continuous rotary motion.

SUMMARY OF THE INVENTION

In one of its aspects, the present invention provides a torque transmission device which includes movable first and second members and at least one pair of balls or rollers of substantially equal diameter maintained in tangential contact with each other, the centers or axes as the case may be of the balls or rollers of said pair lying on a line that is either parallel or perpendicular to the line of movement of the first member as it applies an input force or receives an output force, and at least one of the balls having its periphery in substantially point contact with the second member at a point on the periphery of the said ball that is offset from the line or plane as the case may be joining the centers or axes of the balls or rollers that is not at 90° or 180° to the line or plane joining the ball centers or the roller axes as the case may be.

In a more particular form of the invention, there may be provided a torque transmission device comprising rotary input and output members having a common axis of rotation, at least one pair of rolling elements of substantially equal diameter bearing on each other for transmitting a torque between the input and output members, a line joining the rolling centers of the elements of the or each pair of elements extending parallel to the line of movement of the members normal to the axis of rotation of the members, a substantially line or point contact between at least one of the rolling elements and one of the members through which the torque load of said element is transmitted to said member, said contact being at a position on the periphery of said one element that is offset from said center-joining line in the direction of the axis of rotation and that is located on a radius of said one element that is oblique to said center-joining line, whereby the transmission of the torque load produces an axial force component on said one element, resiliently displaceable means acting on said one element for retaining the elements in coupling engagement with the members.

In such devices, the arrangement may be such that the rolling elements of the or each pair are able to roll on their respective engagements with their members and on each other in counter-rotation to disengage them from torque-transmitting relation with the members, thereby disengaging the drive between the members and a torque loading dependent upon the force applied to the rolling elements by said resiliently displaceable means. It is, however, also possible to so arrange the device that disengagement between the members does not occur but the rolling elements of the or each pair roll on each other to produce an axial displacement of said resiliently displaceable means in dependence upon a predetermined torque load being exceeded, so that the device operates as a torque sensor, and the displacement of said means can be employed to operate a cut-out mechanism for the drive through the device.

BRIEF DESCRIPTION OF THE DRAWINGS

In the accompanying drawings:

FIG. 1 is a diagram of a conventional sliding wedge acting on individual planes in known manner to force the planes apart, FIG. 2 illustrates a prior art arrangement analogous to FIG. 1 but in which the wedge is replaced by twin balls, FIG. 3 is a longitudinal cross-section of a ball detent in a torque transmitting device according to the invention, FIG. 4 is a schematic side elevation of the mechanism in FIG. 3 at a different stage of its operation, FIG. 8 is a partial axial cross-section of another form of a torque transmitting device according to the invention, FIGS. 9 and 10 are detail views in the directions A and B respectively of one of the roller pairs and adjacent parts in the device of FIG. 8.

DESCRIPTION OF THE PREFERRED EMBODIMENTS

FIGS. 3 and 4 illustrate a first embodiment of the invention in the form of a torque-limiting coupling. A cylindrical housing 9A forms part of one rotary member of the coupling and a disc-like member 7 (seen in section) forms the other rotary member. An applied force F causes the member 7 to rotate about an axis parallel to the plane of the paper. A bolt 9 within the housing 9A is urged by a spring 9B towards the member 7. The bolt 9 is recessed at 9C at its outer end, to engage one (8A) of a pair of balls 8A,8B, carried snugly but freely in a recess or bore within the disc-like member 7. The bolt 9 thus makes substantially line contact with the ball 8A. The spring 9B is chosen according to the desired limiting torque and the coupling is disengaged once this value is reached because the bolt 9 is forced to the right thereby freeing the ball 8A from the recess 9C, allowing the disc 7 to rotate freely relative to housing 9A. As this occurs the balls 8A, 8B rotate in the directions shown, thus virtually eliminating any friction at the points marked X and Y.

Reference has been made earlier herein to conventional torque-limiting couplings employing a series of single balls and it will be appreciated that in such constructions the seat angle ($\gamma$) of bolt 9 must be as near 90° as possible in order to sustain a large load F with a reasonably small spring load Q. With an ordinary ball detent skidding is inevitable, introducing friction and inconsistent performance. If lubrication fails at this point after a long period, friction increases. The ratio Q/F then becomes uncertain and the release load erratic. After release, it is required to reverse the bolt action i.e. for the bolt 9 to act in reverse (see FIG. 4) in order to allow the centre line X—X to travel beyond Y—Y. Due to the reversible property, this action is possible with the proposed system but impossible with the ordinary ball detent. After reversal the bolt travel may be arrested by slot 10 in FIG. 3.

In the construction shown in FIG. 3, the rotary member 7 forms a movable first member and the recessed bolt 9 forms part of a movable second member. It will be seen that the line of application of the force applied by movement of the disc 7 (the first member) is perpendicular to the line joining the ball centres. It will also be seen that the contact between the ball 8A and the bolt 9 is offset from the line joining the ball centres and furthermore is on a radius that is not at 90° or 180° to the line joining the ball centres.

Figure 5:
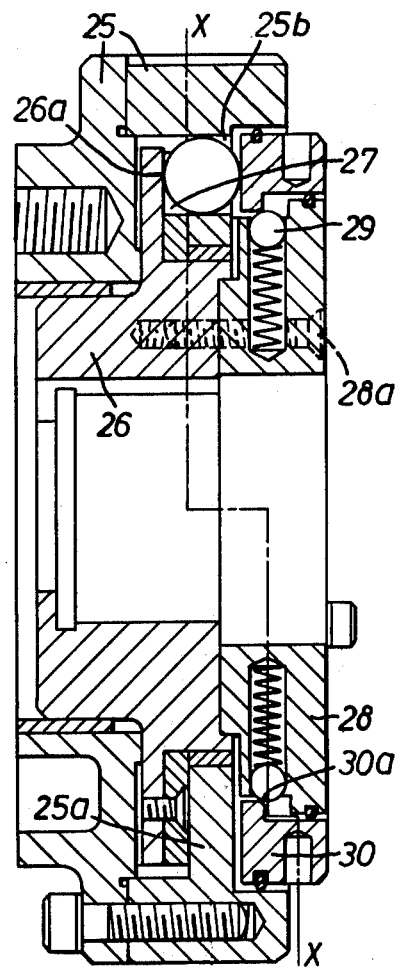
FIGS. 5 and 6 are partial axial and transverse cross-sections of a further form of torque transmitting device according to the invention, FIG. 6 being taken on the line X—X in FIG. 5.
Figure 6:
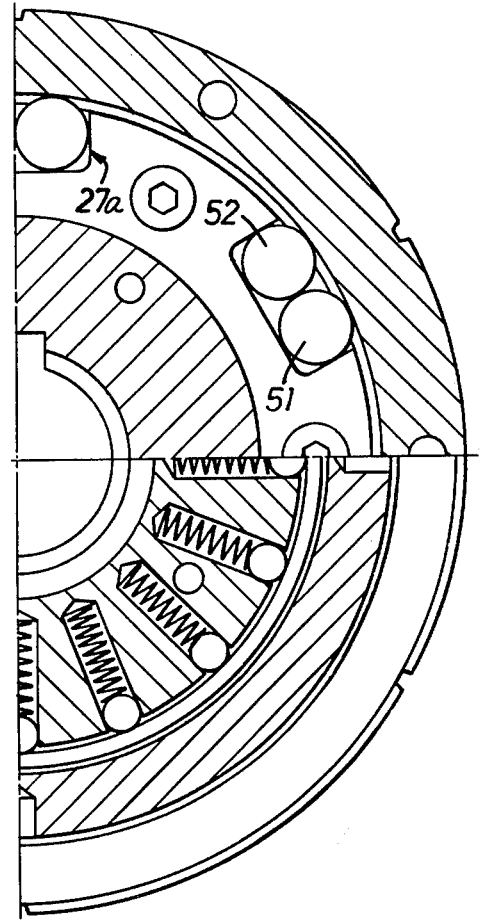

FIGS. 5 and 6 show a torque limiting coupling or clutch according to the invention where the driven half 25 is rotatably mounted on the driving half 26. As can be seen from the drawings, the driven half 25 has an internally directed flange 25a with slots 25b in which the ball pairs 51, 52 are carried so that they are free to move axially. The ball pairs are located axially in driving half 26 bearing on face 26a so that the ball centres lie to the right of section X—X as it appears in the upper half of FIG. 5 and they are held peripherally in rectangular slots 27. A plate 28 secured by screws 28a to the driving half 26 is provided with a number of radially disposed spring loaded balls 29 so that a thrust ring 30 is urged onto the ball pairs by the action of the balls on a chamfer 30a at the inner diameter of the ring so the balls are retained in the slots of the driving half. Thus in the normal operating position shown the clutch halves 25 and 26 are locked together by the ball pairs 51, 52 and the entire clutch will rotate as one unit with the torque being transmitted through the ball pairs.

In this condition the peripheral thrust arising from the torque transmitted is passed from the rear end edge 27a of each slot in the member 26 to the rear ball of the pair in that slot, thence to the leading ball of the pair and thence to the leading edge of the associated slot in the driven member 25. Because the point of contact of the rear ball of each pair with the associated driving half edge is offset from the line joining the centres of the ball pair the transmitted torque load also produces without frictional losses an axial force that acts directly on the thrust ring 30. When this force exceeds the predetermined spring load applied by the balls 29 the ring is thrust axially outwards by the balls 51 and 52 rolling on each other and on the points of contact with the driving and driven halves 26, 25 similarly to the example already described with reference to FIG. 3, and likewise the movements occur virtually without friction, and the cylindrical portion of the inner lip of the ring then keeps the balls 29 in a depressed position. The main ball pairs having been thus expelled from the slots 27 in the driving half, the two clutch halves are free to rotate relatively to one another; i.e. the drive is disconnected. Restoration of the drive is obtained by lining up the two clutch halves in the approximately correct angular position and manually or mechanically pushing ring 30 back again so that the ball pairs are again in the driving position in the driving half slots 27.

Figure 7:
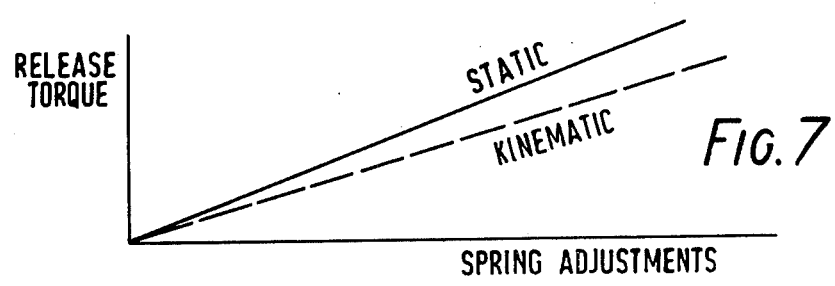
FIG. 7 is a graph illustrating some of the operational characteristics of the device in FIGS. 5 and 6.

The torque release loading can be adjusted by fitting different springs or different numbers of springs, and the graph in FIG. 7 illustrates the relation between static torque setting and spring adjustment. In practice two lines have to be considered; the static line and the kinematic line, i.e., the torque release obtained with the clutch rotating. The important feature of the invention is that the elimination of friction with the twin ball system introduces a degree of repeatability and consistency which is not available in systems employing sliding friction either on splines, balls or rollers.

In the version of the invention illustrated in FIGS. 5 and 6, the movable first member previously referred to is formed by the driven half 25 whose rotary movement is caused by the balls transmitting the torque load thereto. As stated, the leading ball of the pair applies this force, and the reaction is co-linear with the line joining the centres of the ball pair. The movable second member is formed by the driving half 26 making point contact with the other ball of each pair where an edge of the slot 27 engages the ball. As already mentioned, this point is offset from the line joining the ball centres and furthermore it is located on a radius of the ball concerned that is not at 90° or 180° to the line joining the centres of the ball pair.

A further form of torque limiting coupling or clutch is illustrated in FIGS. 8 to 10. A driving member 41 of the coupling has the driven member 42 mounted on it for co-rotation about an axis of symmetry X—X through an angular contact ball bearing 43 and an axial thrust roller bearing 44. The driving member has a series of axially directed bores 45 around its periphery, in which are fixed respective carrier sleeves 46 each having a tubular housing 47 slidably mounted in it and carrying a pair of torque-transmitting rolling elements 48 in the form of barrel-shaped rollers. Each housing 47 is prevented from rotating in its sleeves 46 by a locating plug 49 projecting from the driving member periphery into axial slot 50 in the housing so that the rollers are held with their axes parallel to a radius from the coupling axis X—X through their point of mutual contact. The rollers are connected to opposed flanges 51 of their housings by pins 52, but these act simply as retainers in the initial assembly stage and are a sloppy or "rattling" fit in the rollers, so that they do not restrict in any way the functional movements of the rollers during operation of the coupling.

The rollers transmit their torque load to seating rings 53 fixed in the driven member 42, the barrelling of the rollers conforming to the bore of the seating, as is shown in FIG. 10, or having a slightly smaller radius of curvature to allow for manufacturing errors. The rollers also bear axially on inserts 54 in the driven member which provide an axial location face 55 to determine the location of the rollers relative to the seating rings in the axial direction of the coupling. As illustrated the inserts 54 are screwthreaded to be axially adjustable and are locked in position by elements 56, but it is also possible for the driven member itself to provide integral fixed axial location faces.

Each roller pair is urged against its respective axial location face by a compression spring 57 in its associated housing which act between end plate 58 of the housing and a thrust ball 59 that urges outwards a series of smaller balls 60 held in pockets 61 in the peripheral wall of the housing, the balls 60 thereby engaging an inclined forward face 62 of the sleeve 46 to locate the housing axially and retain the rollers in their operative torque transmission position in an analogous manner to the bearing ring in the embodiment of FIGS. 5 to 7.

Thus, as may be most clearly seen in FIG. 9, the roller centers are co-linear with the point of application of torque load Y from the rear (i.e. circumferentially trailing) edge of the bolt 47 to the rear roller of the roller pair, while the circumferential reaction Z (equal in magnitude to Y) from the bearing ring 53 on the driven coupling part is offset from the line or plane joining the roller centers. The radius from the front or leading ball to its point of contact with the bearing ring is thus oblique to that line or plane and this gives rise to axial force component acting on the front ball which tends to urge the housing 47 rearwards against the compression spring 57. Under normal torque loads, the axial force component has no effect as the balls 60 held in the housing cannot move rearwards without forcing the thrust ball 59 back against the force of the compression spring 57 but the force increases in direct proportion to the load and when a predetermined value is exceeded the housing is forced back and the retaining balls 60 are displaced rearwards of the inclined face 62 with a snap action, and are then retained behind shoulder 64 of the sleeve, after which movement the rollers 48 have been completely withdrawn axially from their bearing rings 53 and the coupling is released.

In the release action, the rollers 48 roll in counter-rotation on each other and on their respective engagement points with the driving and driven parts of the coupling in an entirely analogous manner to the preceding example, i.e. there is a friction-free rolling action at the points through which the main loads are transmitted and the rollers slide only on their bearing face 63 on the housing. Since the axial force component need be only a very small proportion of the torque loading, the reaction on this face is correspondingly small and the friction forces are insignificant in comparison with the torque transmitted through the coupling. The balls 59, 60 are not designed to have the counter-rotating friction-free action of the torque transmitting roller pairs but it will be clear that because the axial force component on the rollers is small, the loads transmitted by these balls are similarly small and the friction forces are therefore negligible.

Figure 11:
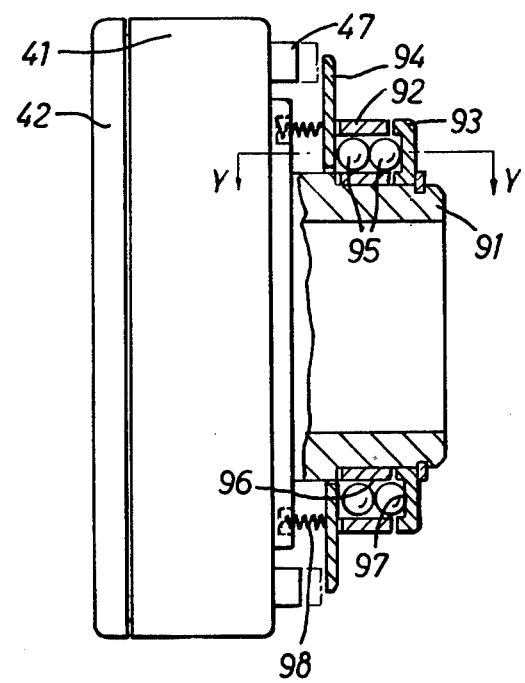
FIG. 11 illustrates a resetting mechanism for the device of FIGS. 8 to 10.
Figure 12:
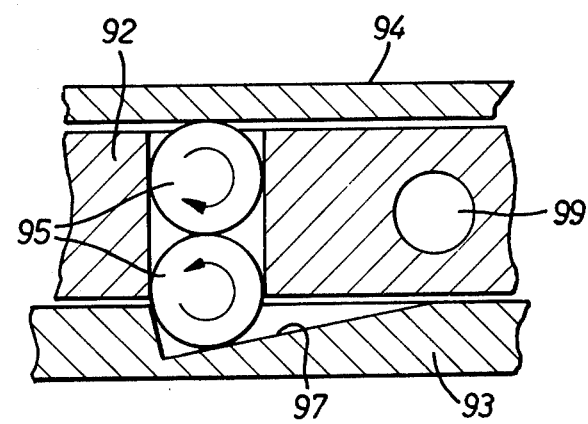
FIG. 12 is a section of the line Y—Y in FIG. 11
Figure 13:
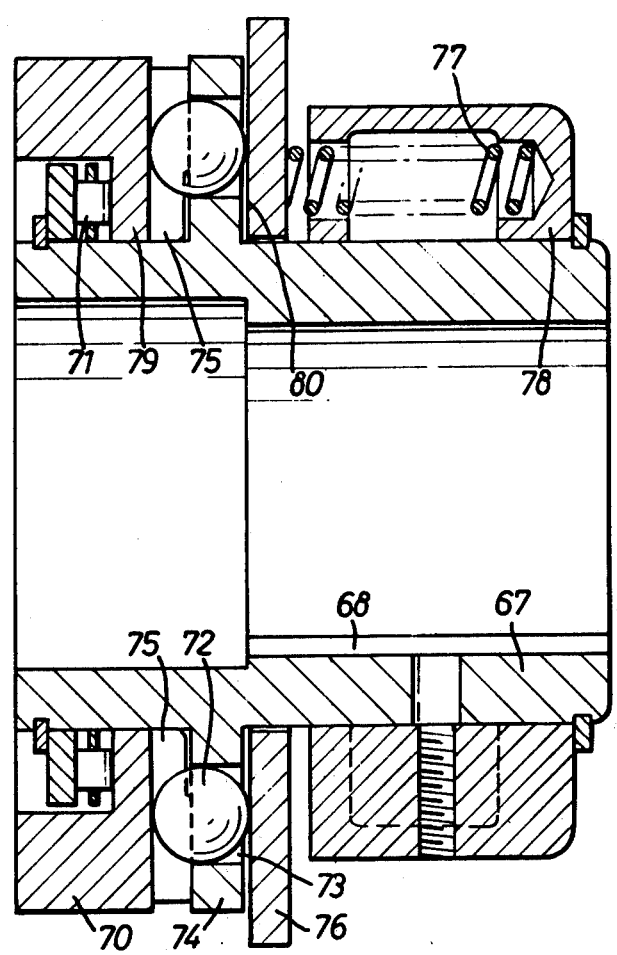
FIGS. 13 and 14 illustrate another form of device according to the invention in an axial section and a partly sectioned transverse view respectively.
Figure 14:
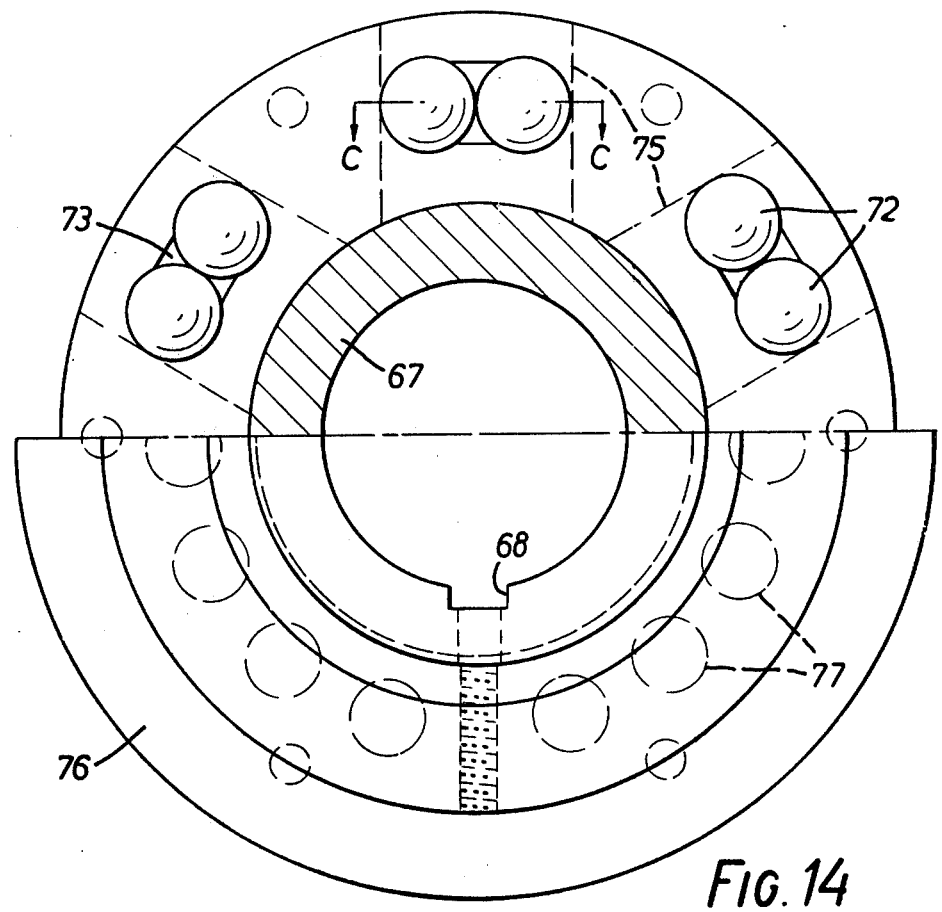
Figure 15:
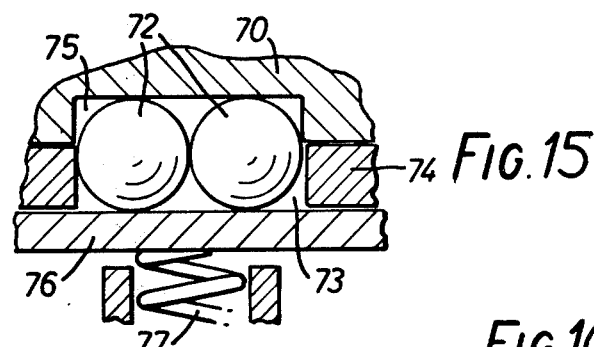
FIG. 15 is a detail view in the direction C indicated in FIG. 14.
Figure 16:
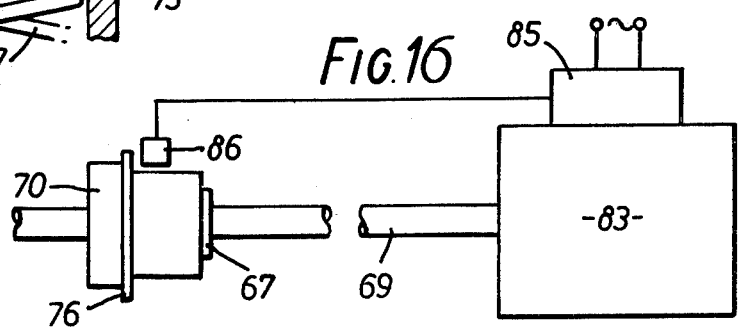
FIG. 16 is a schematic diagram illustrating one mode of use of the device of FIGS. 13 to 15.

To facilitate resetting of the rollers 48 a mechanism may be provided that returns all the housings 47 simultaneously, as shown in FIGS. 11 and 12. A coupling collar 91 is fixed to the driving member 41 and a ring 92 is rotatably mounted on the collar between opposite end plates 93, 94 both rotationally fixed to the collar. Pairs of balls 95 are located in axial bores 96 of the collar and are urged against inclined ramps 97 in the end face of the plate 93 by springs 98 acting on the plate 94, which is so located axially on the collar 91 that the spring force is not transmitted to the ring 92 that simply acts as a rotary guide for the ball pairs 95. One or more radially directed tommy-bar holes 99 are provided in the ring 92 to pivot it on the collar 91.

In the normal running condition of the torque transmitting device, the housings 47 are in the positions shown in full lines. When the rollers are released from driving engagement, the housings move to the broken-line positions, close to but still spaced from the position in which the plate 94 is maintained by the springs 98, and the drive will of course then be released. By now inserting a tommy-bar in one of the holes 99 the user can turn the ring 92 on the collar and with this movement the ball pairs 95 roll up their ramps 97 and are displaced axially, so in turn displacing the plate 94. All the housings 47 are thus pushed back together by the plate 94, the snap action of the retaining balls 60 already referred to carrying them to their fully operative positions. This movement is obtained while the ball pairs 95 still contact their ramps 97. As soon as the tommy-bar is released, therefore, the springs 98 act to push the ball pairs, the ring 91 and the plate 94 back to their illustrated positions.

In the arrangement described, because the axial thrust displacing the plate 94 is transmitted by the ball pairs rolling on each other and on the plates 93,94 as shown in FIG. 12, there is insignificant friction experienced. This facilitates the resetting of all the housings simultaneously and quickly without effort, and also it ensures that the springs 98 can automatically return the plate 94 to its inoperative position, even though the mechanism may be unused for long periods, so preventing the mechanism jamming in its resetting position.

In the arrangement shown in FIGS. 13 to 16, pairs of balls are employed in accordance with the invention to transmit torque between driving and driven members but these members always remain coupled together, and the coupling functions in the manner of a torque sensor.

The driving member comprises a main sleeve 67 provided with a keyway 68 to attach it to the driving shaft 69 (FIG. 16) and the driven member 70 is rotatably mounted upon it through a roller thrust bearing 71. The pairs of balls 72 are carried in pockets 73 in a flange 74 of the driving member, the thickness of the flange being slightly greater than the radius of the balls, and they are urged into recesses 75 in the driven member by an annular bearing plate 76 acted on by a series of compression springs 77 held in housings 78 fixed to the driving member so that they are located between the axially opposed faces 79, 80 of the recesses 75 and the plate 76 respectively. As can be seen most clearly from the detail circumferential view in FIG. 15 the driven member recesses 75 are relatively shallow, somewhat less than the radius of the balls. In each ball pair the torque is transmitted from the rear face of their pocket in the driving member flange at a point coincident with the plane containing the centres of the balls, the thrust therefore being parallel to the direction of movement of the driving member and normal to the rotary axis, and is received by the leading edge of each driven member recess at a point offset from that plane, i.e. a radius of the leading ball to that point being oblique to the line joining the ball centers, so that the reaction between the leading ball and the recess edge is directed slightly obliquely and there is an axial force component developed acting on the bearing plate and here resisted by the loading springs 77.

The configuration so far described corresponds to that in the torque limiting coupling of FIGS. 5 and 6, and as in that example at a torque load determined by the axial loading on the balls, here given by the preloading of the springs 77, the balls begin to roll in counter-rotation on each other and on the points of contact with the driving and driven members to displace the bearing plate 76 rearwards against the force of the springs 77. Unlike the construction in FIGS. 5 and 6, however, the arrangement here does not permit the balls to move out of driving contact with the driven member so that the coupling is not released.

This arrangement may be used where it is simply necessary to have indication that the permitted torque has been exceeded, or where relief of the overload is to be obtained without decoupling the driving and driven shafts, e.g. in cases in which angular registration of the shafts must be maintained. Indication of overload may be observed directly or indirectly from the movement of the bearing plate. This movement can also be used for overload relief, as exemplified in FIG. 16. This shows an electric motor 83 to the driving shaft 69 on which the coupling sleeve 67 is fixed. The motor is operated through a conventional starter and control unit 85 and a micro switch 86 disposed in a fixed position behind the bearing plate 76 is connected to a stop relay (not shown) in the unit. The switch 86 can be actuated by engagement of the plate 76 with it as the plate is moved rearwards by a torque overload, and it then trips the relay in the control unit to stop the motor. The balls 72 return to their illustrated positions as soon as the drive stops and the drive can be resumed simply by restarting the motor once the cause of the overload has been removed.

The switch 86 can be a proximity switch if desired and it is of course possible to use an electrical switch simply to actuate an indication of overload.

What is claimed is:

1. A torque transmission device comprising rotary input and output members having a common axis of rotation, at least one pair of rolling elements of substantially equal diameter in coupling engagement with the members for transmitting a torque between the input and output members while corotating therewith, the two rolling elements of said at least one pair of rolling elements being disposed in tandem in relation to the direction of rotary movement of the members whereby the transmitted torque load is applied in series to the elements of a pair, a line joining the rolling centers of the elements of the or each pair of elements extending parallel to the line of movement of the members normal to the axis of rotation of the members, a contact location between at least one of the rolling elements and one of the members through which the torque load of said element is transmitted, said contact location being at a position on the periphery of said one element that is offset from said center-joining line in the direction of the axis of rotation and that is located on a radius of said one element that is oblique to said center-joining line, whereby the transmission of the torque load produces an axial force component on said one element, resiliently displaceable means acting on said one element for retaining the elements in coupling engagement with the members.

2. A torque limiting coupling comprising a device according to claim 1 wherein support means for said resiliently displaceable means permit movement of said displaceable means with said rolling elements to a position in which the rolling elements are released from driving engagement between the members in dependence upon the force applied on torque overload to the elements by said displaceable means, the arrangement being such that the rolling elements of said at least one pair are able to roll in counter-rotation on respective engagements with their members to disengage them from torque-transmitting relation with the members.

3. A torque limiting coupling according to claim 2 wherein the input and output members comprise at least one pair of axially successive recesses engaged by said at least one pair of rolling elements to transmit the torque between the members by abutting engagement therewith, the respective engagements of said at least one pair of elements with said recesses being mutually axially offset and one of the engagements being axially offset from said line through the rolling centers of the elements in the same direction of offset as the direction of offset of said one engagement with the other engagement, whereby the torque load will produce a force component at said one engagement urging the element away from its abutting coupling part, said resiliently displaceable means acting in opposition to said force component to maintain said abutting engagement until the magnitude of torque load increases said force component to overcome the force applied by the resiliently displaceable means, the arrangement being such that the rolling elements are then able to roll in counter-rotation on their respective engagements with the coupling parts to displace them out of the associated recess or recesses in one of the coupling parts and disengage them from torque-transmitting relation.

4. A coupling according to claim 3 wherein said resiliently displaceable means comprise bistable biasing means arranged to release the axial biasing force on the rolling elements when the displacement of the elements disengages the coupling.

5. A coupling according to claim 4 wherein said resiliently displaceable means comprises a thrust member and resilient means urging said member axially towards the rolling elements, at least one surface on which the resilient means act being inclined to the axial direction and said member being axially displaced in the disengagement of the coupling to a position at which said surface is out of contact with the resilient means.

6. A torque transmission device comprising rotary input and output members having a common axis of rotation, at least one pair of rolling elements of substantially equal diameter disposed in tandem between the input and output members for providing coupling engagement between the members each bearing with a contact location on a respective one of said members for transmitting a torque from the input member through both elements in series to the output member, a line joining the rolling centers of said at least one pair of rolling elements extending parallel to the line of movement of the members normal to the axis of rotation of the members, said contact location of at least one of said pair of rolling elements with one of the members being at a position on the periphery of said one element that is offset from said joining line to one side thereof in the direction of said axis of rotation and that is located on a radius of said one element that is oblique to said joining line so that the transmission of torque through the device by a torque load between said one element and said one member passing through said contact produces an axial force component on said one element, axially displaceable means bearing on said at least one pair of rolling elements and resilient means acting through said displaceable means with a determined force on said elements against said axial force component whereby with increase of torque load the rolling elements of said at least one pair are able to roll in counter-rotation on their respective contact locations with their members to move said displaceable means axially of the device against the resilient means.

7. A rotary torque transmission device which includes a rotary first member, at least one rotary second member, and means for transmitting the torque between said first and second members while co-rotating therewith, comprising at least one pair of rolling elements of substantially equal diameter selected from the group consisting of balls having their rolling centers on a common line and rollers having the rolling centers in a common plane, the two elements of the or each said pair of elements consisting of a rear element and a leading element disposed in tandem in relation to their direction of rotary movement with said members under the action of said torque for transmitting a torque load from the driving member through the rear and leading elements of said at least one pair of rolling elements to the driven member, at least one of the elements of said at least one pair of elements having its periphery in contact with said at least one second member at a point on the periphery on the said element that is offset from said line on which lie the centers of the ball-form rolling elements or said plane on which lie the centers of the roller-form rolling elements, as the case may be, and that is located on a radius of one of said pair of rolling elements directed obliquely to the said line or the said plane on which lie the rolling element centers.

8. A torque transmission device comprising rotary input and output members having a common axis of rotation, at least one pair of axially successive recesses in the respective members, at least one pair of rolling elements of substantially equal diameter disposed in tandem in the associated recess for transmitting a torque between the input and output members by abutting engagement with said recesses, the respective engagements of the elements of said at least one pair of elements with said recesses being mutually axially offset and one of the engagements being axially offset from the rolling centers of the elements in the same direction as the direction of offset of said one engagement with the other engagement, whereby the torque load will produce a force component at said one engagement urging the element away from its abutting coupling part, resiliently displaceable means acting in opposition to said force component to maintain said abutting engagement until the magnitude of torque load increases said force component to overcome the force applied by the resiliently displaceable means, the arrangement being such that the rolling elements are then caused to roll in counter-rotation on their respective engagements with the coupling parts to displace them out of the associated recess or recesses in one of the coupling parts and disengage them from torque-transmitting relation, said resiliently displaceable means comprising a thrust member and resilient means urging said member axially towards the rolling elements, at least one surface on which the resilient means act being inclined to the axial direction and said member being axially displaced in the disengagement of the coupling to a position at which said surface is out of contact with the resilient means, whereby the resiliently displaceable means act as bistable biasing means releasing the axial biasing force on the rolling elements when the displacement of the elements disengages the coupling.

9. A torque transmission device comprising rotary input and output members having a common axis of rotation, at least one pair of axially successive recesses in the respective members, at least one pair of rolling elements of substantially equal diameter disposed in tandem in the or each said recess for transmitting a torque between the input and output members by abutting engagement with said recesses, the respective engagements of the elements of said at least one pair of elements with said recesses being mutually axially offset and one of the engagements being axially offset from a line through the rolling centers of the elements in the same direction as the direction of offset of said one engagement with the other engagement, whereby the torque load will produce a force component at said one engagement urging the element away from its abutting coupling part, resiliently displaceable means acting in opposition to said force component to maintain said abutting engagement until the magnitude of torque load increases said force component to overcome the force applied by the resiliently displaceable means, the arrangement being such that the rolling elements are then caused to roll in counter-rotation on their respective engagements with the coupling parts to displace them out of the associated recess or recesses in one of the coupling parts and disengage them from torque-transmitting relation, said resiliently displaceable means comprising a housing axially displaceably mounted on one of said input and output members, spring means within said housing and a plurality of engagement elements carried by said housing urged to transversely projecting positions by said spring means, a bearing surface on said one member for said engagement elements being inclined to the axial direction, and the engagement elements being urged against said face by said axial force component, said engagement elements being displaced against the force of said spring means in the disengagement of the coupling to a position in which they are out of contact with said inclined surface, whereby the resiliently displaceable means act as bistable biasing means releasing the axial biasing force on the rolling elements when the displacement of the elements disengages the coupling.

10. A torque limiting coupling comprising rotary input and output members having a common axis of rotation, at least one pair of rolling elements in tandem with each other and in engagement each with a respective one of the members while co-rotating therewith for transmitting a torque between the members, resiliently displaceable means acting on said rolling elements for applying a biasing force to maintain them in operative location between the input and output members against a release force generated by the torque load transmitted through the elements, said resiliently displaceable means comprising a housing axially displaceably mounted on one of said input and output members, spring means within said housing and a plurality of engagement elements carried by said housing urged to transversely projecting positions by said spring means, a bearing surface on said one member for said engagement elements being inclined to the axial direction, and the engagement elements being urged against said face by said axial force component, said engagement elements being displaced against the force of said spring means in the disengagement of the coupling to a position in which they are out of contact with said inclined surface, whereby said biasing force of the resiliently displaceable means is then released.

11. A torque limiting coupling comprising rotary input and output members having a common axis of rotation, at least one pair of rolling elements in tandem with each other and in engagement each with a respective one of the members while co-rotating therewith for transmitting a torque between the members, resiliently displaceable means acting on said rolling elements for applying a biasing force to maintain them in operative location between the input and output members against a release force generated by the torque load transmitted through the elements, said resiliently displaceable means comprising bistable biasing means arranged to release the biasing force on the rolling elements when said release force displaces the elements to disengage the coupling, there being further provided resetting means for acting on said bistable biasing means to return the elements into said torque transmitting engagement and re-engage the coupling, said resetting means comprising mutually spaced bearer members, opposed faces on said bearer members and resilient means acting on one of said members to urge it towards the other, at least one pair of further rolling elements in contact with each other and each in contact with a respective bearer member face under the force of said resilient means, guide means engaging said further rolling elements for retaining them in contact with each other and the bearer members, the guide means being movable relative to the bearer members for displacing said further rolling elements along said bearer member faces with rolling of the elements on each other and on said faces, at least one of said faces being inclined relative to said direction of displacement whereby to cause relative displacement of one of the bearer members from the other against the force of the resilient means, said one bearer member thereby acting on the biasing means to re-engage the coupling, and said resilient means acting to return said further rolling elements from their displaced positions along said bearer member faces and to return the displaced bearer member towards the other said member.

* * * * *